Patented Sept. 16, 1924.

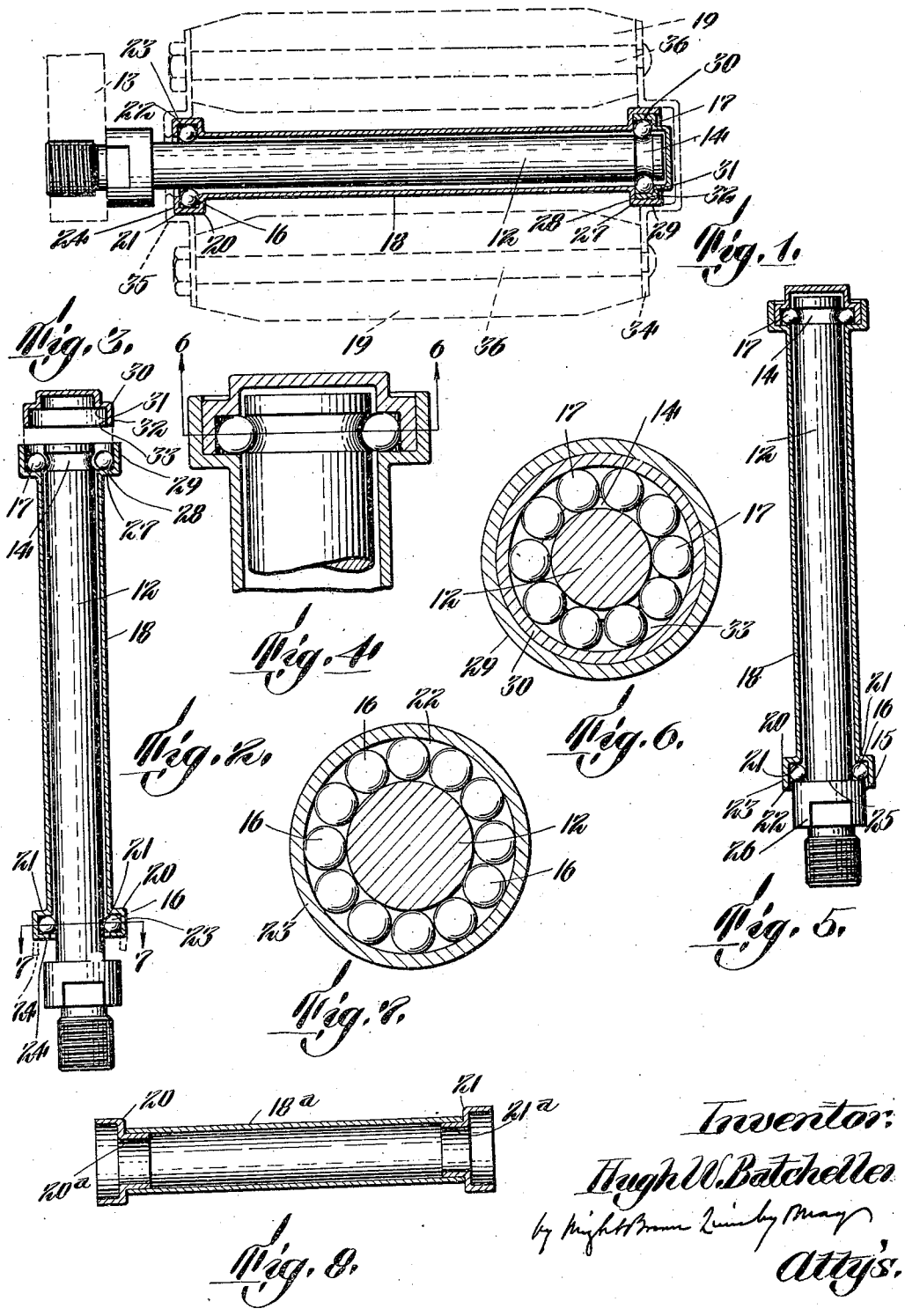

1,508,438

UNITED STATES PATENT OFFICE.

HUGH W. BATCHELLER, OF WORCESTER, MASSACHUSETTS, ASSIGNOR OF ONE-HALF TO H. F. FARRELL, OF WORCESTER, MASSACHUSETTS.

ANTIFRICTION BEARING FOR BICYCLE PEDALS, ETC.

Application filed June 22, 1923. Serial No. 646,997.

*To all whom it may concern:*

Be it known that I, HUGH W. BATCHELLER, a citizen of the Dominion of Canada, residing at Worcester, in the county of Worcester and State of Massachusetts, have invented new and useful Improvements in Antifriction Bearings for Bicycle Pedals, Etc., of which the following is a specification.

This application is a continuation in part of my application for Letters Patent for antifriction bearings for bicycle pedals, etc., filed June 13, 1922, Serial No. 567,999.

The invention relates to an antifriction bearing which includes a cylindrical member or shaft, such as a crank pin or arm of a bicycle crank, a tubular member enclosing said shaft, and two circular series of balls interposed between said members, and slightly spacing the same apart.

One object of the invention is to provide a self-contained antifriction bearing involving a relatively small number of parts, adapted to be conveniently assembled and securely maintained in assembled relation.

A particular object is to enable the tubular member to be coupled to and maintained in a predetermined adjustment on the shaft by one of the said series of balls, so that the tubular member is confined by said balls against endwise movement in either direction on the shaft.

I attain these and other objects which will hereinafter appear, by the improved construction hereinafter described and claimed.

Of the accompanying drawings forming a part of this specification,—

Figure 1 shows partly in section, and partly in side elevation, a bearing embodying the invention, and by dotted lines, a pedal structure secured to the tubular member.

Figure 2 is a view similar to portions of Figure 1.

Figure 3 is a sectional view of the keeper hereinafter described.

Figure 4 is a fragmentary sectional view on an enlarged scale.

Figure 5 is a view similar to a portion of Figure 1, showing an alternative form of ball-confining means.

Figure 6 is a section on line 6—6 of Figure 4.

Figure 7 is an enlarged section on line 7—7 of Figure 2.

Figure 8 shows in section a modified construction of the tubes.

The same reference characters indicate the same parts in all the figures.

One element of my improved self-contained bearing is a cylindrical shaft 12, which may be the wrist-pin of a bicycle crank 13, its inner end being attached to the crank by any suitable means. The shaft has a peripheral groove 14, adjacent to its outer end, the minimum diameter of the groove, or the diameter of its bottom being less than the diameter of the shaft.

A circular series of inner balls 16 contacts with the periphery of the shaft. A circular series of outer balls 17 contacts with the recessed surface formed by the groove 14. Because of the smaller diameter of the grooved portion than the portion with which the inner balls contact, the perimeter of the outer series of balls has a diameter less than that of the inner series, as may be seen by comparing Figures 6 and 7, the balls of each series being preferably of the same size, and the number of balls 17 being less than that of the balls 16. The smaller size of the circular series of outer balls 17 enables said balls to cooperate with the retainer hereinafter described, in coupling a tube or hub 18, forming an element of the bearing, to the shaft 12, in such manner as to adjust or locate the tube in a predetermined position on the shaft and prevent endwise movement of the tube in either direction on the shaft.

The tube 18 in this instance, is a hub with which the usual rubber foot pieces or blocks 19 of a bicycle pedal are connected. The tube is provided at its inner end with an inner cup 20, having a shoulder-forming face 21, contacting with one side of the series of inner balls 16, and a curb portion 23, having an internal face 22, contacting with the perimeter of said series. The inner cup, therefore, maintains the inner balls in loose contact with the shaft, so that when the outer balls are not in coupling engagement with the groove 14, the inner balls may slip or roll lengthwise of the shaft, sufficiently to permit a longitudinal adjustment of the tube on the shaft. Any suitable means may be provided for confining the inner balls 16 in the cup 22, to prevent them from escaping from the cup. Said means may be embodied, for example, in an inwardly turned annular lip or stop 24, surrounding the mouth of the cup, as shown by Figures 1 and 2, and formed after the insertion of the balls in the cup.

A shoulder 25 formed on an enlargement 26 of the shaft, may be utilized for the same purpose, as shown by Figure 5.

The tube is provided at its outer end with an outer cup 27, having a shoulder-forming face 28, contacting with the inner side of the series of outer balls 17, and a curb portion 29, corresponding in form, but not in function, with the curb portion 23 of the inner cup.

30 represents an annular keeper, having a shoulder-forming face 31, contacting with the outer side of the series of outer balls 17, and a flange 32, having an inner face 33, contacting with the perimeter of the series of outer balls. The keeper flange 32 is formed to have a close driving fit in the curb 29 of the outer cup, and is driven in under heavy pressure, so that it is securely fixed to the cup.

The parts may be assembled as next described.

The shaft 12 is inserted in the tube 18 and the balls 17 are then dropped into the cup 27, the shaft and tube being held in upright position with the cup 20 at the upper end of the tube. The balls 16 are then confined in the cup 20, either by forming the stop lip 24 on the cup, as shown by Figure 2, or by causing the balls to rest on the shoulder 25, as shown by Figure 5. The shaft and tube are then inverted to the position shown by Figure 2, the tube being adjusted on the shaft to locate its shoulder face 28 in line with one edge of the groove 14. The outer balls 17 are then dropped into the outer cup and are free to move therein toward the groove. Finally the keeper 30 is forced into and fixed to the outer cup, this operation causing the keeper to force the inner portions of the balls 17 into the groove, as shown by Figure 4. This operation couples the tube to the shaft, so that the tube is securely confined against endwise movement on the shaft. The bearing thus completed is self-contained and may be utilized for various purposes, its members being securely interengaged, so that no external means is required to maintain the bearing in its operative condition.

When the bearing is employed in a pedal, end plates 34, having bosses 35, may be engaged with the tube cups, by forcing the bosses under heavy pressure on to the cups. The end plates support rods 36, on which the pedal blocks 19 are mounted.

It will be seen that the parts of the bearings are interconnected and maintained in their operative relation to each other without the aid of the parts of the pedal.

The face 28 of the outer cup and the faces 31 and 33 of the keeper are arranged to contact at three points with the outer balls 17. Each of said balls has a fourth contact with the surface of the groove 14. Provision is therefore made for permitting the outer balls to run with the minimum of frictional resistance, while preventing endwise movement of the tube in either direction on the shaft.

Figure 8 shows a modification in which the tube and its cups 20 and 21, are made in separate parts, including a tube 18$^a$, which may be thinner and of greater internal diameter than the tube 18, and sleeves 20$^a$ and 21$^a$, formed on the cups, the sleeves being forced into and rigidly secured in the portions of the tube 18$^a$.

The cup 20 at the inner end of the tube is to be mounted on the shoulder 25 of the pin 12, in the manner shown at the lower end of Figure 5. The cup 21 at the outer end of the tube is to receive the keeper 30, in the manner shown at the upper end of Figure 5. This modification differs from the previously described construction, only in that the cups and the body of the tube are made in separate parts, instead of a single part.

I claim:

1. A self-contained antifriction bearing comprising a cylindrical shaft having a peripheral groove adjacent to its outer end, the minimum diameter of the groove being less than the diameter of the shaft; a circular series of inner balls contacting with the periphery of the shaft; a smaller circular series of outer balls contacting with the groove; a tube loosely surrounding the shaft and provided at its inner end with an inner cup, having a shoulder-forming face contacting with one side of the series of inner balls, and an internal face contacting with the perimeter of said series, to maintain the inner balls in loose contact with the periphery of the shaft; means for confining the balls in the inner cup; the tube being provided at its outer end with an outer cup having a shoulder-forming face contacting with one side of the series of outer balls; and a keeper fixed in the outer cup and having a shoulder-forming face contacting with the opposite side of the series of outer balls, and an internal face contacting with the perimeter of said series, to maintain the outer balls in coupling engagement with said groove, and thereby prevent endwise movement of the tube in either direction on the shaft, the arrangement being such that the tube is locked against endwise movement by the operation of securing the keeper to the outer cup.

2. A self-contained antifriction bearing substantially as specified by claim 1, the said outer cup and keeper being formed to contact at three points with the said outer balls, each ball having a fourth contact with the surface of the groove.

In testimony whereof I have affixed my signature.

HUGH W. BATCHELLER.